United States Patent [19]

Serizawa

[11] B 3,995,318

[45] Nov. 30, 1976

[54] RESILIENT TAPE GUIDE ASSEMBLY FOR ROTARY HEAD TAPE RECORDING AND/OR REPRODUCING APPARATUS

[75] Inventor: Akio Serizawa, Kawasaki, Japan

[73] Assignee: Sony Corporation, Tokyo, Japan

[22] Filed: May 22, 1975

[21] Appl. No.: 579,806

[44] Published under the second Trial Voluntary Protest Program on February 3, 1976 as document No. B 579,806.

Related U.S. Application Data

[63] Continuation of Ser. No. 444,362, Feb. 20, 1974, abandoned.

[30] Foreign Application Priority Data

June 13, 1973 Japan............... 48-67583

[52] U.S. Cl.................... 360/130; 360/84
[51] Int. Cl.$^2$......................... G11B 15/60
[58] Field of Search ............... 360/130, 84, 85, 129

[56] References Cited
UNITED STATES PATENTS

| | | | |
|---|---|---|---|
| 3,643,849 | 2/1972 | Roberts................. | 226/199 |
| 3,800,318 | 3/1974 | Jantzen................. | 360/84 |

*Primary Examiner*—Robert S. Tupper
*Attorney, Agent, or Firm*—Lewis H. Eslinger; Alvin Sinderbrand

[57] ABSTRACT

A tape recording and/or reproducing apparatus of the type having a tape guide drum with a circumferential slot through which at least one rotary transducer projects for recording and/or reproducing signals on a tape running against the periphery of the drum in a path which extends about at least a portion of such periphery; is provided with a tape guide assembly which includes a rigid guide, for example, constituted by an axially facing shoulder on the drum, engageable by the lower longitudinal edge of the tape for establishing the direction and location of the tape path, and spaced apart resilient guide elements extending radially on the top surface of the drum and being secured to the latter, at their inner ends, while the free end portions of the resilient guide elements project beyond the guide drum periphery and act yieldably against the upper longitudinal edge of the tape for holding the latter against the rigid guide with each resilient guide element flexing in a plane substantially at right angles to the tape path for accommodating variations and changes in the tape width. Further, a device is provided which acts simultaneously on all of the resilient guide elements for adjustably limiting the movements thereof in the direction toward the tape path.

19 Claims, 13 Drawing Figures

RESILIENT TAPE GUIDE ASSEMBLY FOR ROTARY HEAD TAPE RECORDING AND/OR REPRODUCING APPARATUS

This is a continuation, of application Ser. No. 444,362, filed Feb. 20, 1974 and now abandoned.

BACKGROUND OF THE INVENTION

1. Field of the Invention

This invention relates generally to tape recording and/or reproducing apparatus of the type in which, during recording and reproducing operations, the tape runs about at least a portion of the periphery of a tape guide drum having a circumferential slot or gap through which at least one rotary transducer or magnetic head projects for recording and/or reproducing signals on the tape, and the invention is more particularly directed to an improved guide assembly for establishing the path of the tape on the tape guide drum.

2. Description of the Prior Art

In existing apparatus of the above described type, for example, in existing video tape recorders, the tape guide drum is usually composed of upper and lower drum sections which are mounted on a chassis with a small gap between the drum sections to define the circumferential slot, and the recording medium, such as a magnetic tape, is guided to and from the periphery of the tape guide drum so as to extend helically about at least a portion of the periphery where the tape covers the circumferential slot. Further, two rotary transducers or magnetic heads are mounted on the opposite ends of a rotary support arm within the drum so as to project through the circumferential slot into contact with the tape engaging the periphery of the guide drum so that, in response to rotation of the magnetic heads and advancement of running of the tape, the heads alternately scan successive record tracks which extend obliquely across the tape for either recording or reproducing signals in such record tracks.

Since the tape runs helically on the periphery of the tape guide drum, accurate tracking or scanning of the oblique record tracks by the rotary magnetic heads or transducers requires that the path of the tape on the guide drum be precisely maintained. If the tape on the drum deviates from the predetermined path during either recording or reproducing operations, the quality of the video or other signals reproduced from the tape is deteriorated. Usually, the helical path of the tape on the periphery of the guide drum is established by an upwardly facing, inclined shoulder projecting from the periphery of the lower drum section so as to be engageable by the lower longitudinal edge of the tape. Such upwardly facing, inclined shoulder may be defined by a radially enlarged portion of the lower drum section, or by an arcuate strip secured to, and extending along the periphery of the lower drum section. Since the width of the tape is not precisely uniform, the positioning of the lower edge of the tape has been adopted as the standard for establishing the desired helical path of the tape on the guide drum and obtaining compatibility of various tapes and various recording and/or reproducing apparatus. Of course, when the desired helical tape path is established by engagement of the lower longitudinal edge of the tape with the upwardly facing, inclined shoulder on the lower drum section, the precise positioning of the tape in the desired helical path is achieved only so long as the lower longitudinal edge of the tape is in contact with the shoulder along the full length of the latter. However, during recording and reproducing operations, the tape extending helically about the guide drum may have a tendency to move away from the guiding shoulder, for example, by reason of tension in the tape, with the result that the tape deviates from the desired path.

In order to hold the lower longitudinal edge of the tape against the upwardly facing, inclined guide shoulder on the lower drum section, it has been proposed to employ a downwardly tapering drum section so that tension in the tape will result in forces urging the tape downwardly against the guide shoulder. However, providing the peripheral surface of the upper drum section with such taper and assembling the upper and lower drum sections in the necessary precise relationship to each other are difficult and time consuming operations. Further, in tape recording and/or reproducing apparatus of the described type, horizontal runs of the tape extending to and away from the helical path of the tape on the guide drum are guided by respective tapered guide pins or rollers mounted on the chassis adjacent the guide drum and, in the case where the upper drum section is tapered for urging the tape downwardly against the upwardly facing, inclined guide shoulder, as aforesaid, the tapered buide pins or rollers have to be precisely adjusted so as to permit the tapered upper drum section to achieve the desired effect. Thus, the use of a tapered upper drum section for maintaining the tape in contact with the upwardly facing, inclined guide shoulder involves precise and time consuming adjustments in order to obtain acceptable video or other information signals.

In U.S. Pat. No. 3,261,525, it is proposed to guide the tape on the guide drum by means of rigid studs which are adjustably mounted at spaced apart locations on the upper and lower guide drum sections so as to be engageable with the upper and lower longitudinal edges of the tape running about the guide drum. In order to define the desired helical path of the tape on the guide drum, it is necessary to precisely adjust each of the several guide studs on the upper and lower drum sections. Apart from the time and effort involved in effecting such precise adjustments of the several guide studs, the arrangement disclosed in this patent is disadvantageous in that the engagement of both the upper and lower longitudinal edges of the tape by the rigid guide studs does not provide accommodation for the variations in the width of the tape which cannot be eliminated in the practical manufacture of the tape. Thus, if the tape being employed has a width slightly less than that for which the rigid guide studs have been adjusted on the upper and lower drum sections, then the tape is free to drift laterally between the guide studs and will not follow a precise helical path. On the other hand, if the width of the tape being employed exceeds that for which the rigid guide studs have been adjusted, then the tape will buckle or have its edges damaged by reason of the engagement of both longitudinal edges of the tape with the rigid guide studs.

SUMMARY OF THE INVENTION

Accordingly, it is an object of this invention to provide a tape recording and/or reproducing apparatus, as aforesaid, with an improved guide assembly for maintaining the tape in a precisely predetermined helical path on the tape guide drum while avoiding the previously mentioned disadvantages of the prior art.

More particularly, it is an object of this invention to provide a tape recording and/or reproducing apparatus, as aforesaid, with an improved guide assembly by which the tape is reliably maintained in a predetermined helical path on the tape guide drum without the necessity of effecting precise individual adjustments of the guiding elements, while permitting the use of upper and lower guide drum sections which both have easily produced cylindrical surfaces.

Another object is to provide a tape recording and/or reproducing apparatus, as aforesaid, with an improved guide assembly by which the tape is reliably maintained in a precisely predetermined helical path on the tape guide drum and damage to the tape is avoided, notwithstanding variations in the width of the tape.

Still another object is to provide a guide assembly, as aforesaid, which is relatively simple in construction and easily assembled with the tape guide drum.

A further object is to provide a tape recording and/or reproducing apparatus, as aforesaid, with an improved guide assembly which includes a rigid guide engageable by one longitudinal edge of the tape for establishing the path of the latter on the periphery of the guide drum, and a plurality of resilient guide elements yieldably urged against the other longitudinal edge of the tape.

A still further object is to provide an improved guide assembly for the tape on the guide drum, as aforesaid, in which the movements of the resilient guide elements toward the tape path are simultaneously adjustably limited for accommodating tapes of various widths.

In accordance with an aspect of this invention, a tape recording and/or reproducing apparatus having a tape guide drum with a circumferential slot and at least one rotary transducer or magnetic head projecting through the slot for recording and/or reproducing signals on a tape running against the periphery of the drum in a path which extends about at least a portion of such periphery, is provided with a guide assembly for the tape on the drum which comprises rigid guide means, for example, constituted by an upwardly facing shoulder on a lower section of the drum, engageable by one longitudinal edge of the tape for establishing the direction and location of the tape path, and spaced apart resilient guide elements extending radially on the top surface of the guide drum and being secured to the latter at their inner ends so as to be resiliently flexible in planes substantially at right angles to the tape path, with the free ends of the resilient guide elements acting yieldably against the other longitudinal edge of the tape in such path for holding the tape in contact with the rigid guide means while accommodating variations and changes in the width of the tape.

In accordance with another feature of this invention, an elongated arcuate plate is slidable in an arcuate groove in the tape guide drum and acts simultaneously on all of the resilient guide elements for adjustably limiting movements of the latter in the direction toward the tape path in dependence on the position of the plate along the groove receiving the same.

The above, and other objects, features and advantages of the invention, will be apparent in the following detailed description of illustrative embodiments thereof which is to be read in connection with the accompanying drawings.

DESCRIPTION OF PREFERRED EMBODIMENTS

Figure 1:
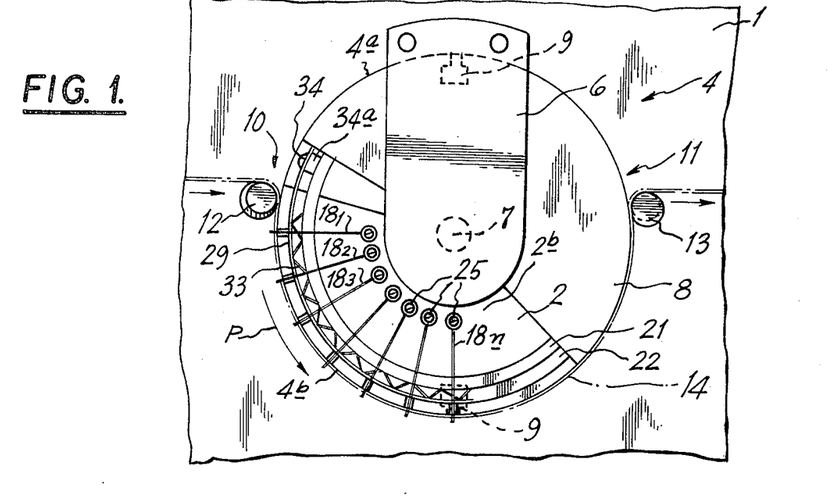
FIG. 1 is a fragmentary top plan view of a portion of a tape recording and/or reproducing apparatus showing the tape guide drum thereof provided with a guide assembly for the tape in accordance with an embodiment of the present invention.
Figure 2:
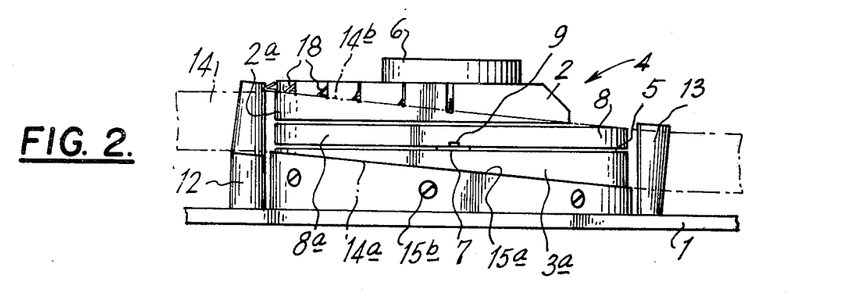
FIG. 2 is a front elevational view of the structure shown on FIG. 1.

Referring initially to FIGS. 1 and 2, it will be seen that a tape recording and/or reproducing apparatus, for example, a video tape recorder, of the type to which the present invention is applied generally comprises a chassis 1 on which there is mounted a tape guide drum 4 made up of upper and lower drum sections 2 and 3. The drum sections 2 and 3 are mounted so as to provide a circumferential slot or gap 5 therebetween, for example, lower drum section 3 may be secured on chassis 1, and upper drum section 2 may be supported above lower drum section 3 in spaced relation to the latter by means of a support bracket 6 located at the back portion 4a of tape guide drum 4. A rotatable shaft 7 projects upwardly from chassis 1 into drum 4 coaxially with the latter, and a disk 8 is secured, at its center, on shaft 7 for rotation with the latter with the periphery of disk 8 extending into gap 5. Transducers, for example, magnetic heads 9 are mounted on lower surface of disk 8 at substantially diametrically opposed locations and project outwardly from slot or gap 5.

Also mounted on chassis 1 at substantially diametrically opposed locations 10 and 11 adjacent the periphery of tape guide drum 4 are guide pins or rollers 12 and 13, respectively, by which a magnetic tape 14 is guided to and away from the periphery of guide drum 4 so that, between guide pins or rollers 12 and 13, tape 14 runs against the periphery of drum 4 in a path which extends about at least the portion 4b of the drum periphery facing away from bracket 6. As shown particularly on FIG. 2, guide pin or roller 12 at location 10 is tapered upwardly and arranged at a relatively high level, while guide pin or roller 13 at location 11 is tapered downwardly and arranged at a relatively low level. By reason of the foregoing arrangement of guide pins or rollers 12 and 13, the tape 14 may be made to approach guide drum 4 in a relatively high horizontal run and to leave guide drum 4 in a relatively low horizontal run, with the tape between guide pins or rollers 12 and 13 running against the portion 4b of the drum periphery in a helical or inclined path so as to cover the slot or gap 5 (FIG. 2). Thus, when, during a recording or reproducing operation of the illustrated apparatus, tape 14 is advanced or made to run in the direction of the arrow P (FIG. 1) and shaft 7 is rotated, for example, at a speed of 30 r.p.s., the opposed magnetic heads 9 on disk 8 alternately scan successive record tracks which extend obliquely across the tape for either recording or reproducing video or other information signals in such record tracks. If desired, and as particularly shown on FIG. 1, the upper drum section 2 may be fan- or sectorshaped so that its arcuate periphery 2a extends from adjacent the location 10, where the tape is fed to guide drum 4, to adjacent the location where the tape 14, by reason of its inclined or helical path on drum 4, moves off drum section 2 engages only the peripheries of disk 8 and lower drum section 3.

Since the tape runs helically on the portion 4b of the drum periphery, accurate tracking or scanning of the oblique record tracks by the rotary magnetic heads or transducers 9 requires that the path of tape 14 on guide drum 4 be precisely maintained. If the tape on guide drum 4 deviates from a predetermined helical path during either recording or reproducing operations, the quality of the video or other information signals reproduced from the tape is deteriorated.

As is usual, the helical path of tape 14 on the portion 4b of the drum periphery is established by an upwardly facing, inclined guide shoulder 15a projecting from the periphery of lower drum section 3 so as to be engageable by the lower longitudinal edge 14a of tape 14. Such upwardly facing, inclined guide shoulder 15a may be defined by a radially enlarged portion formed integrally with lower drum section 3, or by an arcuate strip or band 15 having an inclined upper edge to define the shoulder 15a and extending along the periphery of lower drum section 3 to which strip or band 15 is secured, for example, as by screws 15b. Thus, shoulder 15a provides a rigid guide to establish a predetermined helical path for the tape 14 on drum 4 so long as the lower longitudinal edge 14a of the tape remains in contact with shoulder 15a along the length of the latter.

In accordance with the present invention, lower longitudinal edge 14a of tape 14 is held against upwardly facing, inclined guide shoulder 15a by resilient guide means acting yieldably in the downward direction against the upper longitudinal edge 14b of tape 14. More particularly, such resilient guide means is shown to include a plurality of resilient guide elements $18_1$, $18_2$, $18_3$—$18_n$ which extend radially on the top surface of upper drum section 2 and are spaced apart along at least part of the portion 4b of the guide drum periphery engaged by tape 14.

Figure 3:
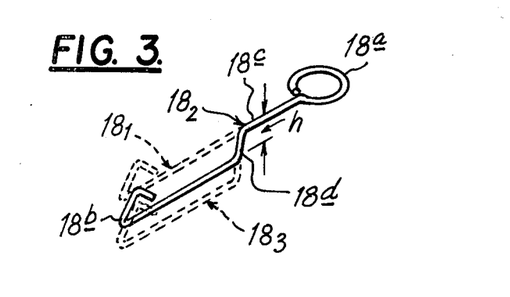
FIG. 3 is an enlarged perspective view of one of the resilient guide elements provided in the apparatus of FIGS. 1 and 2.

As shown particularly on FIG. 3, each of the resilient guide elements $18_1$, $18_2$, $18_3$—$18_n$ may be formed of a length of wire of a non-magnetic and resilient material, such as, stainless spring steel, which is bent or formed to provide an eye or ring 18a at its inner or anchoring end portion, and a triangular outer or contact end portion 18b which lies in a plane perpendicular to that of the ring 18a. As is apparent on FIGS. 3 and 4, the resilient guide element $18_1$, which is nearest to the location 10 at which the tape is fed to the periphery of drum 4 has a substantially straight shank or intermediate portion 18c, while all of the other resilient guide elements $18_2$, $18_3$—$18_n$ have a shank or intermediate portion 18c with a downward offset or step 18d of a height h that increases progressively in the direction toward location 11 at which tape 14 is led away from the periphery of guide drum 4. Thus, when the several resilient guide elements $18_1$, $18_2$, $18_3$—$18_n$ are secured on a flat top surface 2b of upper drum section 2, as by screws 25 received in their respective eyes 18a, the contact end portions 18b of the resilient guide elements are disposed at substantially equal distances from the inclined guide shoulder 15a. Of course, if the top surface 2b of upper drum section 2 is formed with successive steps on which the anchoring end portions or eyes 18a of guide elements $18_1$, $18_2$, $18_3$—$18_n$ are respectively secured, then the shanks 18c of the resilient guide elements can all be formed with offsets of the same height to dispose their contact end portions 18b at equal distances from the inclined guide shoulder 15a.

Figure 4:
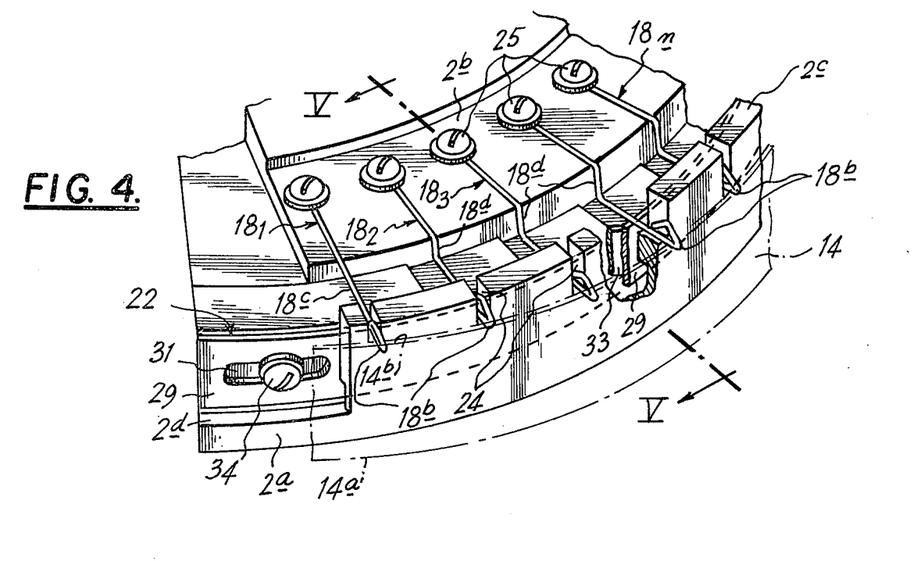
FIG. 4 is a fragmentary, enlarged perspective view, which is partly broken away and in section, and which shows details of the guide assembly according to this invention.
Figure 5:
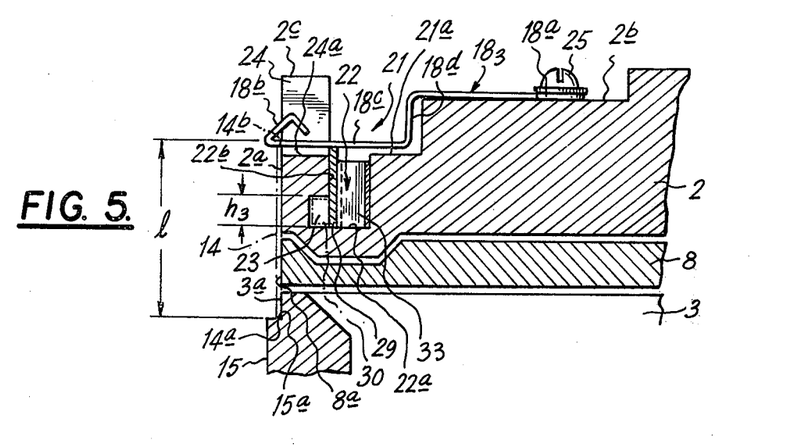
FIG. 5 is a detail sectional view taken along the line V—V on FIG. 4.

As shown particularly on FIGS. 4 and 5, top surface 2b of upper drum section 2 has an arcuate channel 21 formed therein, which channel extends parallel to, and is spaced a small distance radially inward from the periphery 2a of upper drum section 2. The bottom surface 21a fo channel 21 is stepped downwardly therealong in the direction in which the tape path is inclined downwardly, and the wall-like portion 2c of upper drum section 2 defined between channel 21 and the peripheral surface 2a of drum section 2 is formed with spaced apart slits 24 which extend radially through wall-like portion 2c and open at the upper edge of the latter. The slits 24 are of progressively increasing depth so that the lower ends 24a of slits 24 will be substantially horizontally aligned with the corresponding portions of the stepped bottom surface 21a of channel 21. Thus, when the eyes or anchoring end portions 18a of resilient guide elements $18_1$, $18_2$, $18_3$—$18_n$ are secured on top surface 2b of upper drum section 2, the intermediate or shank portions 18c of the resilient guide elements extend across channel 21 and into the respective slits 24 so as to project the triangular contact end portions 18b radially out of slits 24 by a distance that substantially exceeds the thickness of tape 14. By reason of the stepped bottom surface 21a of channel 21 and the progressively increasing depth of slits 24, and further by reason of the downward offsets 18d of resilient guide elements $18_2$, $18_3$—$18_n$ which are of progressively increasing height and which are accommodated in channel 21, the projecting contact end portions 18b are resiliently urged by their respective shanks or intermediate portions 18c to positions that are at equal distances from inclined guide shoulder 15a. It will be apparent that, by reason of the vertically disposed slits 24, the shank or intermediate portion 18c of each resilient guide element can flex resiliently in a plane substantially at right angles to the path of tape 14 on guide drum 4 to permit resilient movement of the respective contact end portion 18b in the direction away from guide shoulder 15a.

Figure 6A:
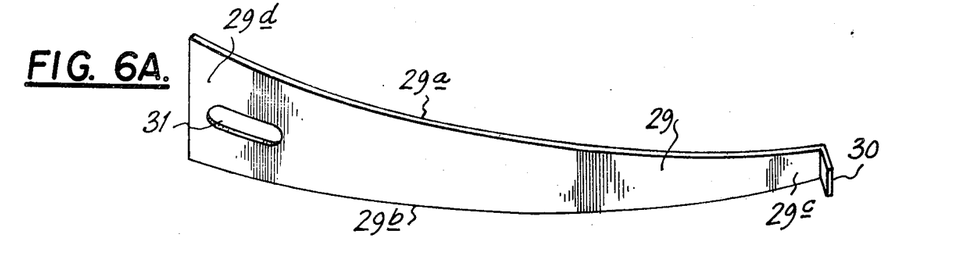
FIGS. 6A and 6B are respectively a perspective view and a front elevational view of a part of the tape guide assembly which is used to adjust the initial positions of the several resilient guide elements.
Figure 6B:
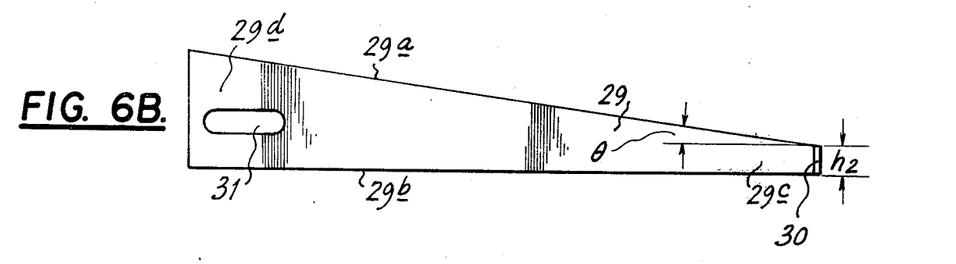
Figure 7A:
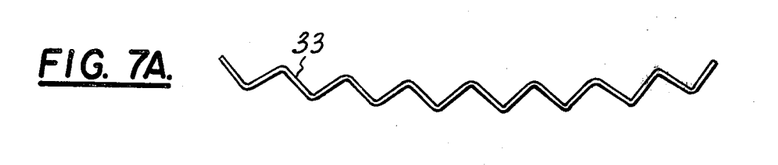
FIGS. 7A and 7B are respectively a top or edge view and a front elevational view of a resilient spacer that is associated with the part of FIGS. 6A and 6B.
Figure 7B:
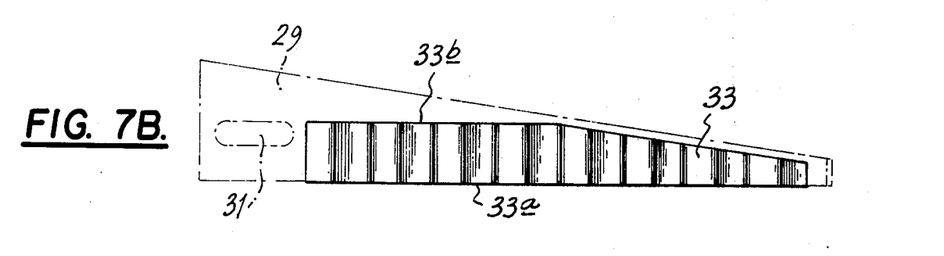

In order to permit simultaneous adjustment of the initial positions of contact end portions 18b of the resilient guide elements, the guide assembly for tape 14 on drum 4 is further shown to include a member 29 which is adapted to simultaneously and adjustably limit the movement of the contact end portions 18b toward the tape path established by inclined guide shoulder 15a. More specifically, as shown on FIGS. 6A and 6B, the member 29 is preferably in the form of an arcuate elongated plate having its upper edge 29a inclined relative to its lower edge 29b by the angle θ which is equal to the angle of inclination of the helical path of the tape on drum 4 established by guide shoulder 15a. The arcuate elongated plate 29 is longitudinally slidable in a similarly arcuate groove 22 (FIG. 5) formed in the bottom surface of channel 21 adjacent wall-like portion 2c of upper drum section 2. The bottom surface 22a of groove 22 lies in a plane parallel to the plane of rotation of magnetic heads 9 so that, when the lower edge 29b of elongated plate 29 rests slidably on bottom surface 22a of the groove, the inclined upper edge 29a of plate 29 extends parallel to inclined guide shoulder 15a. The outer wall surface 22b of groove 22 has an undercut 23 extending therealong, and the end portion 29c of elongated plate 29 which is of relatively small height $h_2$ (FIG. 6B) has an outwardly bent tab 30 that is slidably received in undercut 23 formed with a slightly greater height $h_3$ (FIG. 5). The opposite end portion 29d of elongated plate 29 has a longitudinally elongated slot 31 formed therein and receiving a screw 34 (FIG. 4) which extends through a suitable spacer 34a (FIG. 1) into a tapped hole (not shown) provided in the inner wall surface of groove 22. In order to permit access to screw 34, the adjacent part of wall-like portion 2c of upper drum section 2 is cut away, as at 2d on FIG. 4. It will be apparent that the engagement of screw 34 in slot 31 and the engagement of tab 30 in undercut 23 combine to retain elongated plate 29 in groove 22 while permitting longitudinal sliding movement of plate 29 along such groove. Further, an undulating spring plate 33 (FIGS. 7A and 7B) is inserted in groove 22 between plate 29 and the inner wall surface of groove 22 so as to resiliently urge plate 29 against the outer wall surface 22b of groove 22 (FIG. 5). The bottom edge 33a of undulating spring plate 33 is preferably straight to rest on the bottom surface 22a of groove 22, while the upper edge 33b of undulating spring plate 33 is shaped, as shown on FIG. 7B, so as to lie below the inclined upper edge of plate 29.

Figure 8:
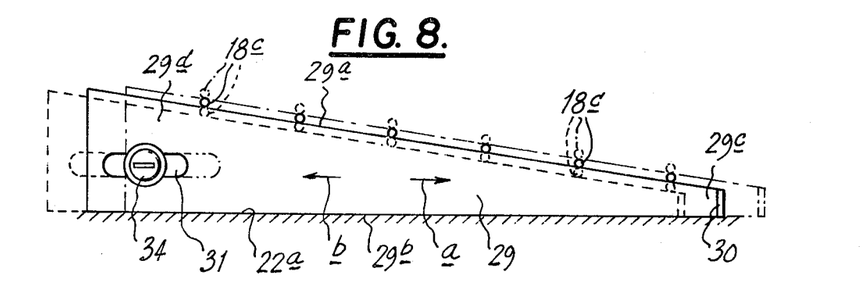
FIG. 8 is a diagrammatic elevational view illustrating how the part of FIGS. 6A and 6B adjusts the initial positions of the resilient guide elements.

By reason of the foregoing arrangement of elongated plate 29, the latter extends under resilient guide elements $18_1, 18_2, 18_3—18_n$ and the shank or intermediate portions 18c of the several resilient guide elements rest on the inclined upper edge 29a of plate 29 (FIGS. 5 and 8). Since upper edge 29a is parallel to inclined guide shoulder 15a, the engagement of edge 29a with shank portions 18c of the resilient guide elements ensures that the projecting contact end portions 18b of the latter will be equally spaced from guide shoulder 15a. When adjusting the distances between contact end portions 18b and guide shoulder 15a, screw 34 is loosened and plate 29 is then longitudinally displaced either in the direction of the arrow a or the direction of the arrow b on FIG. 8. In response to displacement of plate 29 in the direction of the arrow a, contact end portions 18b of the resilient guide elements are all equally raised relative to inclined guide shoulder 15a. Conversely, in response to displacement of plate 29 in the direction of the arrow b, the resilience of shank portions 18c is effective to equally lower all of the contact end portions 18b relative to inclined guide shoulder 15a. After such adjustment of the positions of contact end portions 18b, screw 34 is again tightened for securing plate 29 at its adjusted position in groove 22.

The position of plate 29 along groove 22 is selected so that, with tape 14 absent from tape guide drum 4, the contact end portions 18b of the resilient guide elements will be disposed below the eventual position of the upper longitudinal edge 14b of the tape, that is, so that the distance between each contact end portion 18b and inclined guide shoulder 15a will be slightly smaller than the width $l$ of the tape 14 to be employed. Thereafter, when tape 14 is wrapped about guide drum 4 in the helical path determined by the engagement of lower longitudinal edge 14a of the tape against inclined guide shoulder 15a of the rigid guide, the contact end portions 18b of the resilient guide elements are engaged with upper longitudinal edge 14b of the tape and raised thereby from their original positions resting on plate 29. Such raising of the contact end portions 18b is resiliently resisted by flexing of the respective shank portions 18c so that the contact end portions 18b act yieldably downward against edge 14b of the tape for holding the lower longitudinal edge 14a reliably in contact with fixed guide shoulder 15a. The force thus applied by each resilient guide element to the upper longitudinal edge 14b of the tape is preferably relatively small, for example, in the range from about 2 to 5 grams, so as to avoid damage to the tape while ensuring that the lower longitudinal edge of the tape will be reliably maintained in contact with guide shoulder 15a to cause tape 14 to follow the predetermined helical path on guide drum 4. It has been found that, when resilient guide elements $18_1, 18_2, 18_3—18_n$ are constructed in accordance with the embodiment of the invention illustrated on FIG. 3, the indicated small resilient force for holding tape 14 in contact with guide shoulder 15a while avoiding damage to the tape can be obtained if each resilient guide element is formed of a length of stainless steel spring wire having a diameter of approximately 0.2mm. Even if there are variations in the width of the tape, for example, if the tape being employed has a width slightly greater than the dimension $l$ on FIG. 5, the resilient guide elements are merely further raised thereby so as to continue to exert the desired small yieldable force on the upper longitudinal edge of the tape for holding the lower longitudinal edge 14a against fixed guide shoulder 15a without damage to the tape.

Figure 9:
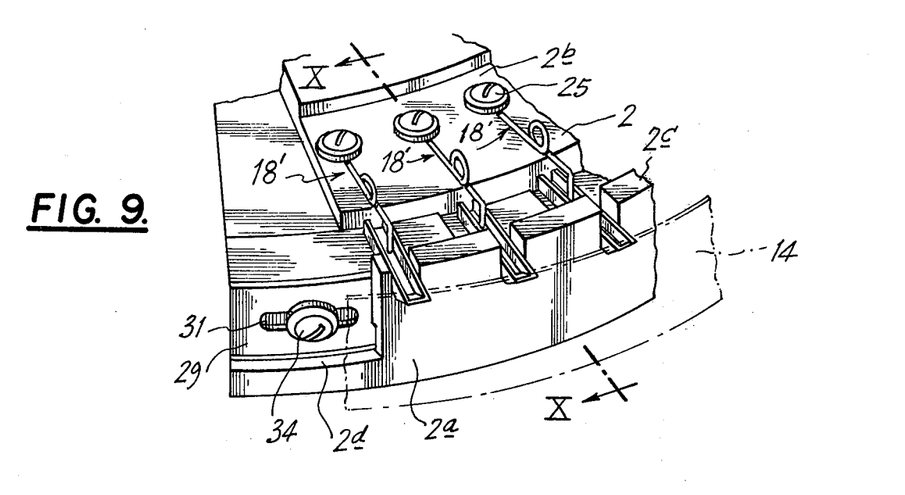
FIG. 9 is a view similar to that of FIG. 4, but showing another embodiment of the invention.
Figure 10:
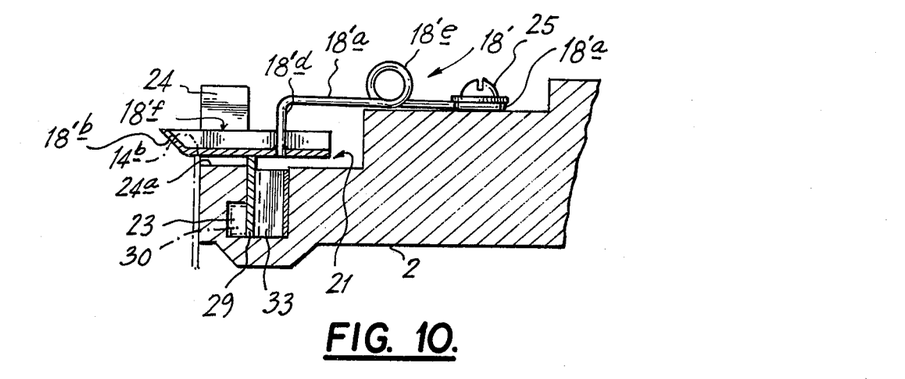
FIG. 10 is a detail sectional view taken along the line X—X on FIG. 9.

Referring now to FIGS. 9 and 10, it will be seen that, in accordance with another embodiment of this invention, each of the resilient guide elements 18' includes a length of stainless steel spring wire having an eye or ring 18'a at its inner or anchoring end portion receiving a screw 25 by which the resilient guide element is secured on top surface 2b of drum section 2. The shank or intermediate portion 18'c extending radially outward from the eye or ring 18'a is shown to have a spring coil 18'e interposed therein, and the offset or step 18'd of shank portion 18'c is shown secured to a rigid shoe 18'f which extends outwardly from channel 21 through the respective slit 24 and terminates in a contact end portion 18'b.

The several resilient guide elements 18' have their offsets 18'd of progressively increasing height considered in the direction of downward inclination of the tape path. Apart from the above described changes in the construction of resilient guide elements 18', the embodiment of FIGS. 9 and 10 is similar to the embodiment of FIGS. 1–5. Thus, it will be apparent that each of the resilient guide elements 18' is mounted on upper drum section 2 and cooperates with plate 29 in the manner described above so that the contact end portion 18'b of each resilient guide element 18' will act yieldably against the upper longitudinal edge of tape 14 for holding the latter against the fixed guide shoulder 15a. However, in the case of each resilient guide element 18', yieldable movement of its contact end portion 18'b in slit 24 is accompanied primarily by flexing of the coil 18'e, that is, by loosening or tightening of its turns, so that the desired small force of approximately 2 to 5 grams can be applied to the upper longitudinal edge of tape 14 by resilient guide elements 18' formed of relatively thicker stainless steel spring wire, for example, wire having a diameter of 0135 to 0.45mm.

Figure 11:
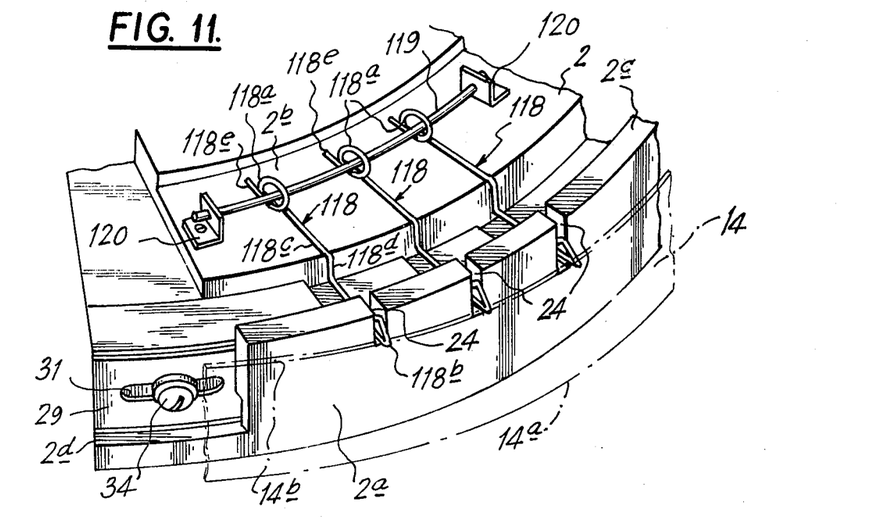
FIG. 11 is another view similar to that of FIG. 4, but showing still another embodiment of the invention.

Referring now to FIG. 11, it will be seen that, in accordance with still another embodiment of the invention, each of the resilient guide elements 118 is formed of a length of stainless steel spring wire which is bent or formed to provide a spring coil 118a at its anchoring end portion which is interposed between a free end 118e and the shank or intermediate portion 118c. An offset or step 118d, similar to the offset 18d on FIG. 3, is formed in shank portion 118c which extends through the respective slit 24 and terminates in a triangular contact end portion 118b. The several resilient guide elements 118 are all mounted on a rod 119 which is secured above top surface 2b of drum section 2 by means of brackets 120 and which extends through the spring coils 118a. The ends 118e of guide elements 118 which extend inwardly of rod 119 bear on top surface 2b to that coils 118a resiliently resist upward movement of contact end portions 118b from their original or adjusted positions determined by plate 29. Apart from the described configuration of guide elements 118 and the mounting thereof on drum section 2, the embodiment of FIG. 11 is similar to that of FIGS. 1–5 and operates similarly to ensure that tape 14 moves in the predetermined helical path.

Although illustrative embodiments of the invention have been described in detail herein with reference to the accompanying drawings, it is to be understood that the invention is not limited to those precise embodiments, and that various changes and modifications may be effected therein without departing from the scope or spirit of the invention as defined in the appended claims. For example, the fixed guide shoulder 15a defined by the strip 15 or radially raised portion of lower drum section 3 may be replaced by a plurality of suitably located fixed guide pins extending from the peripheral surface 3a of the lower drum section; the number and spacing of the resilient guide elements may be varied from those shown on the drawings; and the resilient guide elements may be formed of a suitably resilient synthetic resin rather than of spring wire, as described. Further, the positions of the rigid guide and the resilient guide elements relative to tape 14 may be reversed, that is, the fixed guide shoulder 15a may be engageable with the upper longitudinal edge of tape 14 while the resilient guide elements 18, 18' or 118 act upwardly against the lower longitudinal edge of the tape; and the path of tape 14 on guide drum 4 may be varied from that shown on the drawings, for example, the tape 14 may be fed to the surface of guide drum 4 at location 10 at a relatively low level and be led away from the peripheral surface of guide drum 4 at location 11 at a relatively high level.

Since the tape 14 is precisely guided on the periphery of guide drum 4, the tapered guide pins or rollers 12 and 13 are not relied upon for this purpose and, therefore, need not be too precisely shaped or positioned. In fact, the tapered guide pins or rollers 12 and 13 may each be replaced by fixed arcuate or wing-shaped guide elements or by a plurality of spaced apart guide elements having a relatively larger contact area with the tape for more smoothly guiding the tape to and from the periphery of the tape guide drum.

What is claimed is:

1. In a tape recording and/or reproducing apparatus having a tape guide drum with a circumferential gap, and at least one rotary transducer projecting through said gap for recording and/or reproducing signals on a tape running against the periphery of said drum in a path which extends about at least a portion of said periphery; a guide assembly for the tape on said drum comprising rigid guide means extending along said portion of the drum periphery and engageable by one longitudinal edge of the tape in said path for establishing the direction and location of said path, and a plurality of elongated resilient guide elements spaced apart along at least part of said portion of the periphery of said tape guide drum; said drum having a plurality of spaced apart radial slots for said resilient guide elements, respectively, and each of said resilient guide elements including an anchoring end portion secured to said guide drum, an intermediate portion extending radially in respect to said guide drum from said anchoring end portion through the respective one of said slots and being resiliently movable independently of the other resilient guide elements in a plane substantially at right angles to said path, and a contact end portion at the radially outer end of said intermediate portion projecting from the respective slot beyond said periphery and acting yieldably against the other longitudinal edge of the tape in said path for holding the tape in contact with said rigid guide means while accommodating variations and changes in the width of said tape.

2. A tape recording and/or reproducing apparatus according to claim 1; in which said tape guide drum includes upper and lower drum sections between which said gap is defined, said rigid guide means is provided on one of said drum sections, and said resilient guide elements are mounted on the other of said drum sections.

3. A tape recording and/or reproducing apparatus according to claim 2; in which said rigid guide means is provided on said lower drum section so as to be engageable by the lower longitudinal edge of said tape, and said resilient guide elements are mounted on said upper drum section so as to act yieldably against the upper longitudinal edge of the tape.

4. A tape recording and/or reproducing apparatus according to claim 1; in which said rigid guide means defines a shoulder projecting from said periphery of the tape guide drum at least along said portion of the periphery.

5. A tape recording and/or reproducing apparatus according to claim 4; in which said rigid guide means is integral with said tape guide drum and constituted by a portion of the latter having a larger radial dimension than the remainder of said drum.

6. A tape recording and/or reproducing apparatus according to claim 4; in which said rigid guide means is constituted by an arcuate strip secured to, and extending along at least said portion of the periphery of said drum.

7. A tape recording and/or reproducing apparatus according to claim 1; in which said direction of the path of the tape is in a plane at an angle to the plane of rotation of said rotary transducer.

8. In a tape recording and/or reproducing apparatus having a tape guide drum with a circumferential gap, and at least one rotary transducer projecting through said gap for recording and/or reproducing signals on a tape running against the periphery of said drum in a path which extends about at least a portion of said periphery; a guide assembly for the tapee on said drum comprising rigid guide means extending along said portion of the drum periphery and engageable by one longitudinal edge of the tape in said path for establishing the direction and location of said path, a plurality of resilient guide elements spaced apart along at least part of said portion of the periphery of said tape guide drum, each of said resilient guide elements including an anchoring end portion secured to said guide drum, an intermediate portion extending radially in respect to said guide drum from said anchoring end portion and being resiliently movable independently of the other resilient guide elements in a plane substantially at right angles to said path and a contact end portion at the radially outer end of said intermediate portion projecting beyond said periphery and acting yieldably against the other longitudinal edge of the tape in said path for holding the tape in contact with said rigid guide means while accommodating variations and changes in the width of said tape, and means acting on all of said resilient guide elements for adjustably limiting the movement of said contact end portion of each resilient guide element in the direction toward said path.

9. In a tape recording and/or reproducing apparatus having a tape guide drum with a circumferential gap, and at least one rotary transducer projecting through said gap for recording and/or reproducing signals on a tape running against the periphery of said drum in a path which extends about at least a portion of said periphery; a guide assembly for the tape on said drum comprising rigid guide means extending along said portion of the drum periphery and engageable by one longitudinal edge of the tape in said path for establishing the direction and location of said path, and a plurality of resilient guide elements spaced apart along at least part of said portion of the periphery of said tape guide drum, each of said resilient guide elements including an anchoring end portion secured to said guide drum, an intermediate portion extending radially in respect to said guide drum from said anchoring end portion and being resiliently movable independently of the other resilient guide elements in a plane substantially at right angles to said path, and a contact end portion at the radially outer end of said intermediate portion projecting beyond said periphery and acting yieldably against the other longitudinal edge of the tape in said path for holding the tape in contact with said rigid guide means while accommodating variations and changes in the width of said tape; and in which said tape guide drum includes upper and lower drum sections between which said gap is defined, said rigid guide means is provided on said lower drum section, said upper drum section has an arcuate channel in its top surface adjacent to the periphery of said upper drum section and slots opening radially outward from said channel to said periphery of the upper drum section, and said resilient guide elements have said anchoring end portions secured on said top surface of the upper drum section and said intermediate portions extend across said channel to project said contact end portions through said slots.

10. A tape recording and/or reproducing apparatus according to claim 9; in which said direction of the path of the tape on said drum is in a plane at an angle to the plane of rotation of said rotary transducer, and said intermediate portions of at least certain of said resilient guide elements have downward steps which are received in said channel and increase in depth successively in the direction of downward inclination of said path.

11. A tape recording and/or reproducing apparatus according to claim 10; in which said channel has an arcuate groove in the bottom thereof, and an arcuate elongated plate is slidable longitudinally in said groove and has an inclined upper edge engageable with said steps of the intermediate portions of said resilient guide elements for simultaneously and adjustably limiting the movement of said contact end portions toward said path.

12. A tape recording and/or reproducing apparatus according to claim 9; in which said anchoring end portion of each resilient guide element has a spring coil between said intermediate portion and a free end, and a rod is secured on said top surface of the upper drum section and extends through said spring coil of each resilient guide element with said free end bearing on said top surface.

13. A tape recording and/or reproducing apparatus according to claim 9; in which said anchoring end portion of each resilient guide element has an eye through which a screw extends into said top surface for securing the respective resilient guide element on said upper drum section.

14. A tape recording and/or reproducing apparatus according to claim 9; in which said intermediate portion of each of said resilient guide elements has a spring coil interposed therein for the resilient movement in said plane substantially at right angles to said path of the tape on said drum.

15. In a tape recording and/or reproducing apparatus having a tape guide drum with a circumferential gap, and at least one rotary transducer projecting through said gap for recording and/or reproducing signals on a tape running against the periphery of said drum in a path which extends about at least a portion of said periphery; a guide assembly for the tape on said drum comprising rigid guide means extending along said portion of the drum periphery and engageable by one longitudinal edge of the tape in said path for establishing the direction and location of said path, a plurality of resilient guide elements spaced apart along said portion of the periphery and individually acting yieldably against the other longitudinal edge of the tape in said path at locations spaced apart along the latter for holding the tape in contact with said rigid guide means while accommodating variations and changes in the width of said tape, and means acting on all of said resilient guide elements for adjustably and similarly limiting the movement of all of said resilient guide elements in the direction toward said path.

16. In a tape recording and/or reproducing apparatus having a tape guide drum including upper and lower drum portions which are spaced apart along the periphery of the guide drum for defining a circumferential gap, and at least one rotary transducer projecting through said gap for recording and/or reproducing signals on a tape running against said periphery of the guide drum in a path which extends about at least a portion of said periphery; a guide assembly for the tape on said drum comprising rigid guide means extending along said portion of the drum periphery and engageable by one longitudinal edge of the tape in said path for establishing the direction and location of said path, and a plurality of elongated resilient guide elements spaced apart along at least part of said portion of the periphery of said tape guide drum, said upper drum portion having a plurality of spaced apart slots for said resilient guide elements, respectively, each of said slots being directed outwardly in the upper surface of said upper drum portion and opening at said upper surface and at said periphery of the tape guide drum, and each of said resilient guide elements including an inner end portion secured to said upper surface of the upper drum portion at a respective location spaced inwardly from said periphery, an intermediate portion extending outwardly in respect to said guide drum from said inner end portion through the respective one of said slots and being resiliently movable independently of the other resilient guide elements in a plane substantially at right angles to said path, and a contact end portion at the outer end of said intermediate portion projecting from the respective slot beyond said periphery and acting yieldably against the other longitudinal edge of the tape in said path for holding the tape in contact with said rigid guide means while accommodating variations and changes in the width of said tape.

17. In a tape recording and/or reproducing apparatus having a tape guide drum with a circumferential gap, and at least one rotary transducer projecting through said gap for recording and/or reproducing signals on a tape running against the periphery of said drum in a path which extends about at least a portion of said periphery; a guide assembly for the tape on said drum comprising rigid guide means extending along said portion of the drum periphery and engageable by one longitudinal edge of the tape in said path for establishing the direction and location of said path, and a plurality of elongated resilient wire guide elements spaced apart along at least part of said portion of the drum periphery; each of said resilient wire guide elements including an inner end portion mounted on said drum at a respective location spaced inwardly from said drum periphery, an intermediate portion extending outwardly in respect to said drum from said inner end portion of the respective resilient wire guide element and being resiliently movable independently of the other resilient wire guide elements in a plane substantially at right angles to said path, and a contact end portion at the outer end of said intermediate portion which projects beyond said drum periphery and acting yieldably against the other longitudinal edge of the tape in said path for holding the tape in contact with said rigid guide means while accommodating variations and changes in the width of the tape.

18. A tape recording and/or reproducing apparatus according to claim 17; in which said inner end portion of each of said resilient wire guide elements has a spring coil interposed between said intermediate portion of the respective resilient wire guide element and a free inner end of the latter; and in which mounting means for said resilient wire guide elements is provided on top of said drum and includes a rod spaced inwardly from said drum periphery and extending through said spring coil of each resilient wire guide element, and means defining a bearing surface against which said free inner end of each resilient wire guide element bears.

19. A tape recording and/or reproducing apparatus according to claim 17; in which said inner end portion of each resilient wire guide element is mounted on the top of said drum, and said contact end portion of each resilient wire guide element is at a level below that of the respective inner end portion.

* * * * *